United States Patent [19]  
Lalande

[11] 3,812,416  
[45] May 21, 1974

[54] FORCED COMMUTATION INVERTORS  
[75] Inventor: Michel Lalande, Le Vesinet, France  
[73] Assignee: La Telemecanique Electrique, Nanterre, France  
[22] Filed: July 27, 1972  
[21] Appl. No.: 275,497

[30] Foreign Application Priority Data  
July 28, 1971 France................................ 71.27745

[52] U.S. Cl. .............................. 321/45 R, 321/45 C  
[51] Int. Cl. ........................................... H02m 7/52  
[58] Field of Search ........................ 321/45 R, 45 C

[56] References Cited  
UNITED STATES PATENTS  
3,406,327 10/1968 Mapham et al........................ 321/45  
3,656,047 4/1972 Yarema et al. .................. 321/45 C X  
3,466,528 9/1969 Adams................................... 321/45  
3,405,346 10/1968 Krauthamer...................... 321/45 C  
3,532,901 10/1970 Cavallius et al. ...................... 321/11  
3,582,757 6/1971 Achinger............................... 321/11  
3,675,110 7/1972 Kelley, Jr........................ 321/45 C X  
3,683,264 8/1972 Schieman...................... 321/45 C X  
3,684,936 8/1972 Graf...................................... 321/11

Primary Examiner—William M. Shoop, Jr.  
Attorney, Agent, or Firm—William Anthony Drucker

[57] ABSTRACT  
The invention relates to a D.C. to A.C. convertor, i.e., an invertor, including at least two pairs of main thyristors, at least two pairs of cut-off thyristors, means to effect triggering of the thyristors in accordance with a predetermined cycle, an oscillatory reversal circuit comprising an inductor and a capacitor connected in series between the common point of the main thyristors and the common point of the cut-off thyristors, booster diodes associated with the main thyristors, auxiliary inductors to protect the thyristors against rapid current and voltage variations, and supplementary circuits for protection against transitory states of current and voltage, connected in parallel with the thyristors, the auxiliary protective inductors, connected in series with the thyristors, forming part, not of the sections of the circuit in parallel with the booster diodes, but of the oscillatory reversal circuit.

4 Claims, 4 Drawing Figures

FORCED COMMUTATION INVERTORS

The invention relates to forced commutation or switching invertors. These devices, which are intended to produce from a direct voltage one or more voltages having positive and negative half-waves following one another in accordance with a predetermined cycle, generally comprise two pairs of main thyristors which alternately supply current to the load, at least two pairs of cut-off thyristors which are driven in order to cut-off, at the desired instant, one or other of the main thyristors, at least one oscillator circuit, generally comprising an inductance and a capacitance in series, which supplies to the main thyristor the inverse current required for its cut-off, and so-called booster diodes associated with the main thyristors.

The simplest known invertor configurations do not allow sufficiently high switching or commutation frequencies to be obtained in certain applications, notably for driving variable speed A.C. motors, when the drive voltage must be of very refined form.

This is due, in particular, to the difficulty of overcoming the dangers of premature triggering of the thyristors due to transitory reversal phenomena and accidental short-circuit currents.

Certain imperfect solutions have been proposed, such as protecting the thyristors by means of inductors; or providing protective circuits comprising resistors and capacitors.

These solutions do not allow adequate performances to be achieved in all cases.

The invention proposes a more refined and original solution which consists both in a specific configuration for the circuits, and a precise determination of the value of their components.

According to an important feature of the invention auxiliary protective inductors which are connected in series with the thyristors or equivalent semi-conductor elements are not part of the sections of circuit in parallel with the booster diodes, and form part of the cut-off oscillator circuit.

According to another feature of the invention, a protective circuit, connected to the terminals of each thyristor, comprises a capacitor in series with a substantially inductance-free resistor and with a combination comprising a diode connected in parallel with a resistor having a high value of inductance, the said diode being oriented in the same direction as the corresponding thyristor, and in the opposite direction to the corresponding booster diode.

In order that the invention may be more readily undetstood, reference will now be made to the accompanying drawings, in which.

Figure 1:
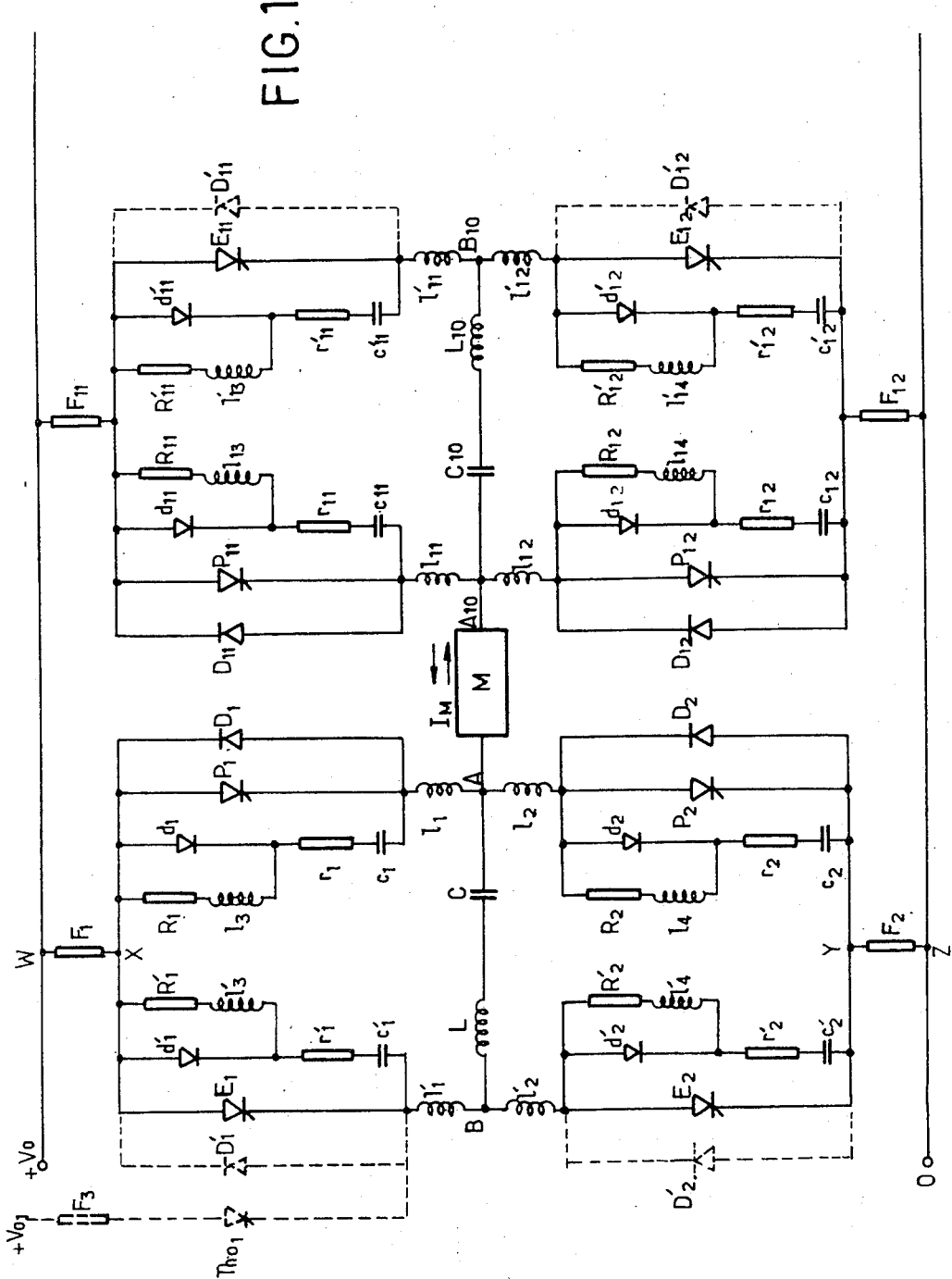
FIG. 1 is a circuit diagram of a preferred embodiment of the invention.

The circuits shown in FIG. 1 are that associated with two phases of, for example, a 3-phase invertor including three identical phase circuits fed by the same D.C. source Vo. (For a single-phase invertor it will be necessary to use, as is shown, two identical circuits). Such a circuit is intended to supply a current $I_M$, divided up in accordance with a more or less complex circuit pattern, to a useful load M, which can be a motor winding, for example.

Only one of the two phase circuits shown will be described in detail. The other phase circuit is identical. The homologous components of the two phase circuits are respectively denoted by the same reference letters with indices differing from 10, such as $F_1$ and $F_{11}$, $E_1$ and $E_{11}$, etc. The phase circuit considered comprises, in a manner known per se:

— two main thyristors P1 and P2, which supply the current IM;

— two cut-off or auxiliary thyristors E1 and E2. By causing E2 to fire, P2 is cut-off, the firing of P1 or P2 being achieved, as is that of E1 or E2, by means of logic circuits (not shown) which excite the triggers;

— a capacitor C and an inductor L which intervene in the change-over, i.e., from positive to negative, to supply an inverse discharge current required to cut off the main thyristors, — two so-called "booster" or "free-wheeling" diodes D1 and D2 which maintain the continuity of the current IM in the load when the corresponding main thyristor is cut-off, when the load is inductive, — optionally, the two diodes D'1 and D'2 intended to make the invertor circuit symmetrical, if this is desired.

When in the conventional manner, the components are limited to those listed above, the firing of one of the main thyristors results in an extremely high voltage rise $dv/dt$ being applied to the other main thyristor. This entails the use of high-performance thyristors without, however, guarding against the risk of premature triggering.

Moreover, if, as a result of an operational fault in the logic circuits which supply the trigger pulses or waves, the simultaneous triggering of P1 and P2 or E1 and E2 occurs, a short-circuit having a very rapid rate of increase occurs, which may destroy the thyristors.

When, as the circuit diagram shows, additional inductors l1, l2, l'1, l'2 are connected in series between P1 and P2 on the one hand, and E1 and E2 on the other, respectively, the disadvantages mentioned are overcome, but a new disadvantage occurs:

When, for example, P1 is cut off, which is achieved by triggering E1 by means of the electrical circuits mentioned above, a cut-off current Ic flows through E1, l'1, L, C, l1, P1 in a direction to reverse the voltage at the terminals of capacitor C. In the course of their change-over, the resistances distributed throughout the circuit (e.g., the impedance of the semi-conductors and the resistance of all the components) cause the capacitor C to lose charge, and the final charge voltage of C is lower, in absolute value, than the initial charge voltage. Also, in the course of the triggering process of P2 which follows, it is necessary to keep E1 triggered until the capacitor C is charged, by means of a current flowing through E1, l1, L, l2, P2, at a value at least equal to its initial charge (without which the charge in C would rapidly dissipate).

In the case of an oscillating load, there are half-waves when the voltage at the terminals of L is such that, if l2 is in parallel with D2 via the appropriate main thyristor, as is the case in the known circuits, the said diode becomes conductive, thus giving rise to short-circuit current in the loop l2, P2 and D2. This short-circuit current similarly arises in the loop E1, l'1, D'1 (D'1, being, in the known circuits, in parallel with the combination E1, l'1). As long as the latter current is flowing, it maintins E1 conductive and, to prevent a short-circuit in the arm E1, E2, it cannot then trigger E2.

Now, the short-circuit currents in the two loops mentioned above decay exponentially with a time-constant inversely proportional to the total resistance of the loop.

In practice, their decay time is always distinctly greater than the half-cycle of the oscillating circuit LC. The final result is a considerable increase in the total change-over time formed by the sum of the cut-off time of the main thyristor, the additional recharging time of C, and the decay time of the short-circuit currents.

This reduction in the possible reversal or commutation frequency is highly prejudicial in certain applications.

In the circuit embodying the invention it will be seen that the diodes, such as D1, D2, D'1, D'2, are connected in anti-parallel to the terminals of the appropriate thyristor, the additional inductors (l1, l2, l'1, l'2) no longer forming with the diodes, loops in which short-circuit currents may flow.

The diodes D1 and D2 are identical and preferably of the fast type, with only a shallow variation gradient for the recovery current, as will be explained below.

In addition, protective circuits protecting against current and voltage transients are connected in parallel with the thyristors:

to the terminals of P1, a resistor R1 having a high inductive value, represented by an inductor l3, is connected in series with a non-inductive resistor r1 and a capacitor C1; a diode d1 is connected in parallel with R1 with its anode towards the positive terminal + Vo.

to the terminals of P2 is connected a circuit R2, r2, c2, d2, identical to the circuit R1, r1, c1, d1 (same component values, the resistor R2 having an inductive value indicated by 14).

to the terminals of E1 is connected a circuit R'1 r'1 c'1 d'1, and to the terminals of E2 is connected a circuit R'2, r'2, c'2, d'2 having the same configuration as the foregoing (the resistor R'1 having an inductance indicated by l'3 and the resistor R'2 having an inductive value indicated by l4).

These two latter circuits are mutually identical, but may not be identical to the first two with regard to component values.

Finally, the right-hand arm XAY of the circuit (X is the upper terminal of the phase, linked to the positive terminal W of the source by an ultra-fast fuse F1, i.e., a fuse having a current-time rating less than that of the semi-conductors, to protect the semi-conductors, Y being the lower terminal linked to the negative terminal Z of the source by an ultra-fast fuse F2) comprises two identical portions XA and AY; the left-hand arm XBY similarly comprises two mutually identical portions XB and BY, and may or may not be identical to the right-hand arm. The optional diodes D'1 and D'2 are shown in broken lines.

Figure 2:
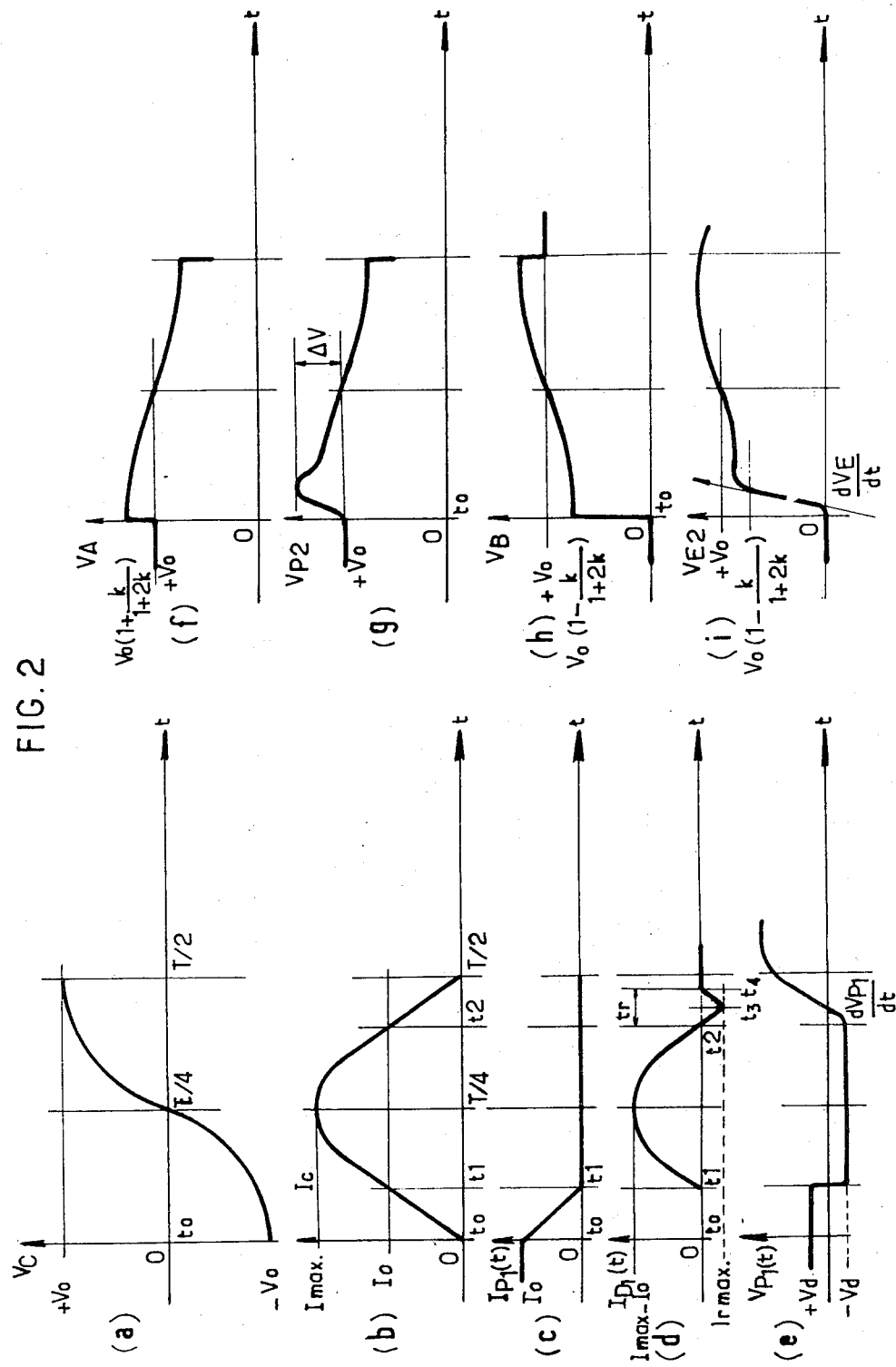
FIG. 2 shows the currents and voltages at different points in the circuit of FIG. 1.

FIG. 2 shows the progress of the currents and voltages between a time to at which P1 is conductive (the other thyristors being cut off) and a time T/2 (T being the oscillation period of the circuit L +l1 +l'1 C), during the cut-off of the thyristor P1 caused by the triggering of the thyristor E1.

The wave-form ($a$) shows the sinusoidal voltage VC ($t$) at the terminals of the capacitor C. The initial charge Vo has been taken to be negative (positive reference pole on the anode side of the thyristor P1).

When E1 is triggered, a sinusoidal current Ic first flows through E1, l'1, L, C, l1, P1 (inverse recombination current of the thyristor), then as soon as P1 is cut-off (at time $t1$ at which the current IP1 falls to zero), and when the inverse current has attained the value Io: wave-form ($d$), through E1, l'1, L, C, l1, D1.

The time $t1$, $t2$ (wave-form ($c$)) when the diode D1 is conductive (so that an inverse voltage is applied to the terminals of P1) must be at least equal to the de-ionisation time of P1.

This time $t2 - t1$ is a function of the parameters C, L, T, Vo, Im, $k$ and $k'$ ($k$ being the ratio between l2 or l1 and L, and $k'$ being the ratio between l'2 or l'1 and L) which gives the first condition imposed on the values of these parameters.

The voltage Vp1 at the terminals of D1 (or of P1) is represented by the wave-form ($e$). It initially has a value Vd, of the order of 1 volt, which reverses at time $t1$, then again reverses at time $t2$, as will be explained below.

The voltage VA between the points A and Y is shown by the wave-form ($f$). At time to, this voltage changes suddenly from value Vo to a value Vo $(1 + k/1+2 k )$, if it is assumed that $k = k'$.

This results in the voltage Vp2 at the terminals of D2 (or of P2) being subjected to an overvoltage (wave-form ($g$)) and reaching a maximum value Vo + $\Delta$ V (after which it decreases).

$\Delta$V is obviously a function of Vo, of $k$, of $k'$ (the ratio between l'1 or l'2 and L), L, r (value of the resistor r1 or r2), c (capacity of the capacitor C1 or C2). It is imperative that Vo + $\Delta$V be smaller than the maximum voltage which P2 can bear. A judicious selection of the values indicated above allows this object to be achieved, and P2 to be thus protected against overvoltages. Similarly a judicious selection of $r'$ (the value of $r'1$ or $r'2$) and $c'$ (the value of $c'1$ or $c'2$) will allow P1 to be protected against overvoltages when P2 is triggered.

At time to, the voltage VB between the point B and Y also undergoes an abrupt rise (wave-form ($h$)), changing from value O to a value VO $(1 - K/1 + 2 k )$. This results in the voltage VE2 at the terminals of E2 itself rising abruptly with a gradient dVE/$dt$ which is a function of the parameters Vo, $k$, $k'$, L, $r'$ and $c'$. It will therefore be necessary to select these parameters such that the gradient dVE/$dt$ is less than the maximum gradient that the thyristor E2 can accomodate without tirggering. This condition can only easily be fulfilled if $r'2$ is non-inductive. (The existence of an inductance would cause an instaneous voltage to appear and thus an abrupt variation in voltage).

Similarly r and c will need to be selected to prevent E1 from triggering at the time when E2 is triggered. Thus $r2$ will need to be non-inductive.

It has been assumed above that neither $\Delta$V nor the gradient dVE/$dt$ depend on the values of the resistors R2 and R'2. It has also been mentioned that the resistors $r2$ and $r'2$ which play a part in determining $\Delta$V and dVE/$dt$ should not possess any notable inductance, which implies that R2 and R'2 are out of action at that time.

Diodes $d2$ and $d'2$ are the means whereby this result is obtained by short circuiting the resistors R2 and R'2 when a sudden increase in voltage occurs in the direction of conduction of these diodes.

The thyristors also need to be protected against excessively fast rises in current which could destroy them.

Such currents can arise from the protective circuits themselves.

Thus, when E1 is triggered, the capacitor C'1, which was initially charged to the voltage Vo, discharges through the resistors R'1, $r'1$ and the thyristor E1 (in a direction such that the diode $d'1$ is then put out of action and thus does not short-circuit R'1). In the absence of the inductance 1'3 possessed by the resistor R'1, there would be an instantaneous change in E1 from zero current value to a value equal to $Vo/r + R'1$ and thus an infinite gradient of rise.

By selecting a resistor R'1 of the wire-wound type with a high inductive value, it is easy to limit the said gradient to an acceptable value.

Onto this discharge current of $c'1$ is superimposed, in the thyristor E1, the cut-off current Ic already mentioned (wave-form ($b$) in FIG. 2). The gradient of rise of this current is a function of Vo, L $(1 + k + k')$ and C. The various parameters Vo, 1, $k$, $k'$, C, C', $r$ and R' (R' being the value of R'1 or R'2) will finally be selected so that the sum of the two gradients mentioned above is smaller than the gradient of current-rise tolerated by the thyristor E1 (or the identical thyristor E2).

Protection of the thyristor against an accidental short circuit in the source Vo is achieved by means of inductors 11 and 12 which limit the gradient of rise of this current.

For instance, in the case of accidental simultaneous triggering of P1 and P2, a short circuit current arises between the terminals W and Z, through F1, P1, 11, P2 and F2. The maximum gradient of rise of this current is equal to Vo/2l. It will therefore merely be necessary to select 1 so that this gradient may be tolerated by the thyristors.

The fuses F1 and F2 ensure thermal protection of the transistors in case of short circuit. The advantage of providing two fuses arranged as shown in FIG. 1 is to protect both branches XAY and XBY at the same time. Moreover, a single fuse per phase would be, in practice, inadequate to protect the thyristors against the short circuits which may rise at the terminals of the load, such as A, when the latter is formed, for instance, by synchronous motors which can operate as generators.

With a circuit having four fuses, the change-over current would travel through the fuses.

If the foregoing explanation of the operation of the circuit is analyzed, it will be seen that the inductances 11, 12 and 1'1, 1'2:

1. - are associated with the main change-over inductor L and capacitor C to take part in the cut-off of the main thyristor (P1 or P2).

The total cut-off inductance thus becomes equal to $L(1 + k + k')$; therefore the cut-off time of the said thyristor depends on $k$ and $k'$ which gives a first equation defining $k$ and $k'$.

2.- protect each main thyristor against the overvoltage which occurs when the cut-off thyristor of the other main thyristor is triggered (which gives a second equation defining $k$ and $k'$).

3.- protect each cut-off thyristor against the sudden voltage variation which arises at its terminals when the other cut-off thyristor is triggered (which gives a third equation defining $k$ and $k'$).

4.- protect each cut-off thyristor against the rapid current rise which occurs when it is itself triggered (which gives a fourth equation defining $k$ and $k'$).

5.- protect the thyristors against the sudden current rise in case of accidental short circuit (which gives a fifth equation defining $k$ and $k'$).

These five equations, which also involve at least some of the parameters C, K, Vo, Im, $r$ and R', define suitable values of $k$ and $k'$. It is finally possible to obtain very high change-over frequencies without the risk of damaging the thyristors.

The inductances 11, 12, 1'1, 1'2, are arranged so as to not to form with the diodes D1 D2, D'1 D'2, loops in which short-circuit currents can flow.

Another important feature of the invention resides in the fact that the resistors R1, R2, R'1, R'2, are inductive and, when an abrupt voltage rise occurs, are short-circuited by the diodes $d1, d2, d'1, d'2$, these diodes on the other hand being oriented so that they are put out of action each time there is an abrupt current variation as a result of the triggering of the associated thyristor. These inductive resistors thus help to protect the thyristors against rapid current variations when they are triggered, while not affecting the normal operation of a protective circuit without an inductive element in the case of an abrupt variation in voltage.

Figure 4:
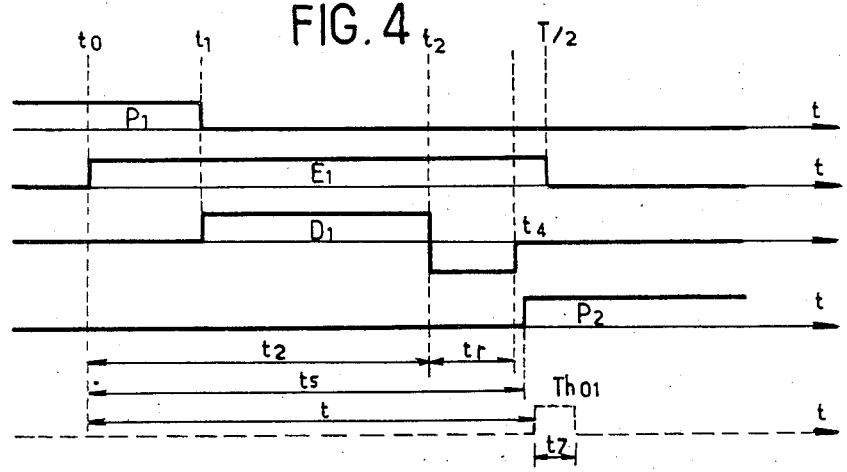
FIG. 4 shows the logic output states of certain of the components in the circuit.

FIG. 4 shows a particularly advantageous operational sequence of the invertor.

Each wave-form shows the conductive condition of the component bearing the reference symbol shown on the curve. The times to, t1 and T/2 are those already referred to above.

The diode D1 conducts between t1 and t2; then an inverse current flows therein between t2 and a time t4 for a period tr which corresponds to the recovery time of the diode. During this period, the inductor 11 stores a certain amount of energy which gives rise to a current in the circuit d1, $r1$, C1. There is a voltage variation at the terminals of P1 which is the greater the higher the maximum value attained by the current Ir and the greater its gradient of variation. To reduce these two parametrs the invention proposes delaying the application of the inverse voltage to the diode D1 by delaying the time t5 at which the thyristor P2 is triggered (and thus the appearance of voltage Vo between terminals X and A).

The condition $t5 \geq t2$ max.$+tr$ max. is imposed.

Since the circuit must operate for all values of current Im, and, in particular, for a zero value (no load), it is best to keep: $t2$ max. = $t/2$.

$tr$ max. is the maximum value of recovery time which may be encountered in a production run of the type of diode used.

Therefore the condition finally imposed is $t5 \geq T/2 + tr$ max.

The circuit, such as has just been described, is not suitable for supplying loads which require wide variations in voltage from the supply source Vo.

When the direct voltage Vo has a variable amplitude there is added to the said circuit a source at the common point between E1 and 1'1 by means of a thyristor Tho1. This supplementary portion of the circuit has been shown in dotted and dashed lines in FIG. 1. In the case in which it is employed, the diodes D'1 and D'2 must not be employed, since there would then be a short circuit between the sources Vo and Vo1. On the other hand, it is then necessary to provide an additional protective fuse F3.

The thyristor Tho1, as the last wave-form (broken lines in FIG. 4) shows, must be triggered after a time t6 at least equal to t5, i.e., after the cut-off circuit has performed its function.

During the period of conduction t7, a current supplied by Vo1 flows through Tho1, 1'1, L, C, 12, P2 and F2, and fully recharges the capacitor C, thus compensating for the losses arising at each change-over. In fact, this compensation cannot occur when Vo is variable, as it can when Vo is constant, by reason of the simple fact that E1 may remain conductive for a certain time after P2 has been triggered, thus providing an additional recharge circuit for C through E1 and P2.

It will be seen that the circuit thus formed is asymmetrical, Tho being connected to the upper terminal of 1'1. In this way, in the case of a short circuit between Vo, Tho1, 1'1, 1'2, and F2, $di/dt$ is reduced by the presence of 1'1 and 1'2 in series.

It will be understood that various modifications may be made to the circuits described and illustrated without departing from the scope of the invention as defined in the appended claims.

Figure 3:
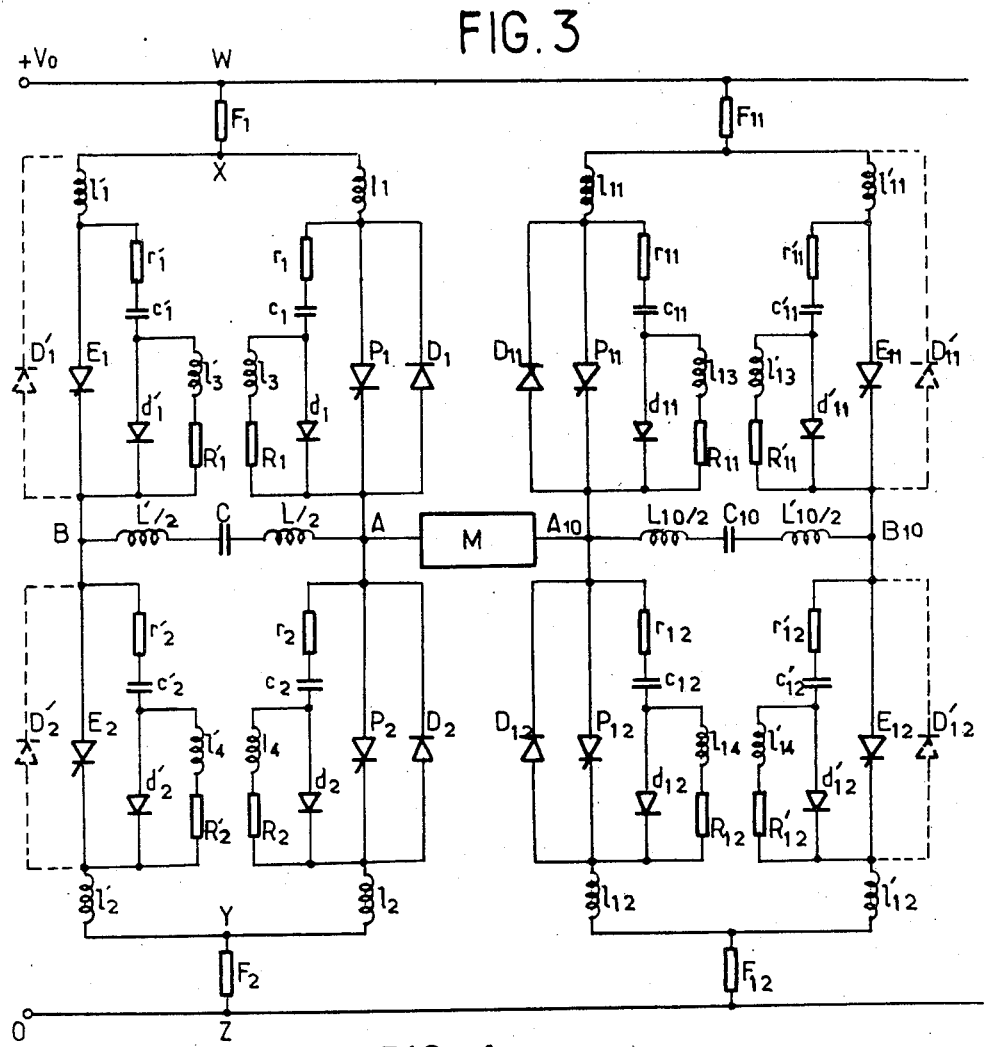
FIG. 3 shows a modification of the circuit.

In particular the circuit of FIG. 3, which is equivalent to that of FIG. 1, could be used.

Other obvious permutations of the arrangement of the connections of certain components could be effected.

Naturally, the thyristors may be replaced by other semi-conductors, or by elements equivalent to semi-conductors, and the use in the appended claims of the term "thyristors" is to be construed as encompassing such equivalents or alternatives.

I claim:

1. An invertor, including at least two pairs of main thyristors or other equivalent semi-conductor elements, at least two pairs of cut-off thyristors or other equivalent semi-conductor elements, triggerable in accordance with a predetermined cycle, an oscillatory commutation circuit comprising an inductor and a capacitor connected in series between a common point of the main thyristors of each pair, booster diodes associated with at least the main thyristors, auxiliary inductors for protecting the thyristors against rapid current and voltage variations supplementary circuits for protection against transitory states of current and voltae connected in parallel with the thyristors, wherein a protective circuit connected to the terminals of each thyristor comprises a capacitor in series with a substantially inductance-free resistor and with a combination comprising a high resistor with a natural self-induction in parallel with a diode, the diode being oriented in the same direction as the corresponding thyristor, and in the opposite direction to the corresponding booster diode.

2. An invertor according to claim 1, intended to operate with a variable amplitude D.C. voltage supply, including a supplementary source of constant D.C. voltage, and means to cause a current supplied by the said supplementary source to flow in the said commutation circuit for a predetermined time interval in each operational sequence.

3. An invertor according to claim 2, wherein the said means comprise an auxiliary thyristor connected to one of the cut-off thyristors and to the corresponding auxiliary protective inductor at their common point, and means to isolate the said auxiliary thyristor at a moment not preceding the moment of triggering of the main thyristor associated with the other auxiliary thyristor.

4. An invertor, of the impulse commutated variable output frequency type, including at least two pairs of main thyristors or other equivalent semi-conductor elements, at least two pairs of cutt-off thyristors or other equivalent semi-conductor elements, triggerable in accordance with a predetermined cycle, an oscillatory commutation circuit comprising an inductor and a capacitor connected in series between a common point of the main thyristors of each pair and a common point of the cut-off thyristors of each pair, booster diodes associated with at least the main thyristors, auxiliary inductors for protecting the thyristors against rapid current and voltage variations, supplementary circuits for protection against transitory states of current and voltage connected in parallel with the thyristors, and output terminals each of which is conductively connected to the common point of the main thyristors of each pair, intended to operate with a variable amplitude D.C. voltage supply, including a supplementary source of constant D.C. voltage, and means to cause a current supplied by the said supplementary source to flow in the said commutation circuit for a predetermined time interval in each operational sequence.

* * * * *